United States Patent [19]

Hemdal

[11] Patent Number: 4,785,414
[45] Date of Patent: Nov. 15, 1988

[54] COMPUTER SYSTEM WITH AUTOMATIC RANGE CHECKING AND CONVERSION OF DATA WORDS

[76] Inventor: Goran A. H. Hemdal, 10 Sabna Court Parkland Grove, Ashford, Middlesex TW15 2JN, United Kingdom

[21] Appl. No.: 774,593
[22] PCT Filed: Dec. 20, 1984
[86] PCT No.: PCT/GB84/00446
    § 371 Date: Aug. 20, 1985
    § 102(e) Date: Aug. 20, 1985
[87] PCT Pub. No.: WO85/02922
    PCT Pub. Date: Jul. 4, 1985

[30] Foreign Application Priority Data

Dec. 21, 1983 [GB] United Kingdom ............... 8334079

[51] Int. Cl.[4] .......................................... G06F 13/00
[52] U.S. Cl. .................................................... 364/900
[58] Field of Search ... 364/200 MS File, 900 MS File

[56] References Cited

U.S. PATENT DOCUMENTS 3,930,232 12/1975 Wallach et al. ...................... 364/200
3,945,002  3/1976 Duttweiler et al. ............. 340/347 D
4,542,456  9/1985 Hill .......................................... 364/200

OTHER PUBLICATIONS

Computer Architecture News, vol. 9, No. 4, Jun. 15, 1981, N.Y. (U.S.), D. D. Hill: "A Hardware Mechanism for Supporting Range Checks", pp. 15–21, see p. 18, paragraph 1; p. 19, paragraph 3; p. 20, paragraphs 1, 2.

Primary Examiner—Eddie P. Chan
Attorney, Agent, or Firm—Kenyon & Kenyon

[57] ABSTRACT

The disclosure relates to a computer system having a central processing unit and a main memory for storage of information in binary form. A master control unit is provided for performing individual and selected range checking and range conversion by reading of information from an internal memory of the master controlled unit which contains a data Descriptor Table with a table entry for each individually accessible data element in the main memory with two elements of each Descriptor Table entry assigned for range check and conversion purposes. One of the elements permits one of the extreme limits of a value range of a data element in the main memory associated with a data Descriptor Table entry to be determined and the second element allows the number of values in the value range of the associated data element to be determined. There is also provided a set of arithmetic circuits interposed in the data path to and from the main memory to be utilized for each read of write of information to and from the main memory. Thus the arithmetic circuits receive their input from the main memory and from the data Descriptor Table entry for a data element and deliver their output to the central processor unit by reading of information from a main memory and also receive input from the central processor unit and the Data Descriptor Table entry for the data element and deliver a corresponding output to the main memory. The master control unit has means for generating an interrupt signal to the central processor unit in the case of an out of range value being detected.

10 Claims, 4 Drawing Sheets

FIG. 2.

| VALUE NR | $2^3$ | $2^2$ | $2^1$ | $2^0$ | REPRESENTATIONS: A | B | C |
|---|---|---|---|---|---|---|---|
| 1 | 0 | 0 | 0 | 0 | 0 | 0 | — |
| 2 | 0 | 0 | 0 | 1 | 1 | 1 | — |
| 3 | 0 | 0 | 1 | 0 | 2 | 2 | — |
| 4 | 0 | 0 | 1 | 1 | 3 | 3 | 0 |
| 5 | 0 | 1 | 0 | 0 | 4 | 4 | 1 |
| 6 | 0 | 1 | 0 | 1 | 5 | 5 | 2 |
| 7 | 0 | 1 | 1 | 0 | 6 | 6 | 3 |
| 8 | 0 | 1 | 1 | 1 | 7 | 7 | 4 |
| 9 | 1 | 0 | 0 | 0 | 8 | -8 | 5 |
| 10 | 1 | 0 | 0 | 1 | 9 | -7 | 6 |
| 11 | 1 | 0 | 1 | 0 | 10 | -6 | 7 |
| 12 | 1 | 0 | 1 | 1 | 11 | -5 | 8 |
| 13 | 1 | 1 | 0 | 0 | 12 | -4 | 9 |
| 14 | 1 | 1 | 0 | 1 | 13 | -3 | — |
| 15 | 1 | 1 | 1 | 0 | 14 | -2 | — |
| 16 | 1 | 1 | 1 | 1 | 15 | -1 | — |

COMPUTER SYSTEM WITH AUTOMATIC RANGE CHECKING AND CONVERSION OF DATA WORDS

BACKGROUND OF THE INVENTION

This invention relates to computer systems and the general object of the invention is to increase the capacity and software security of binary computers by means of logic circuitry, which is interposed between a standard CPU, (such as one represented by Motorola MC68000, INTEL 80286 etc.) and the memory accessed from this CPU.

SUMMARY OF THE INVENTION

The invention provides a computer system having a central processing unit and a main memory for storage of information in binary form and a master control unit for performing individual and selected range checking and range conversion by reading of information from an internal memory of the master control unit, the internal memory of the master control unit containing a Data Descriptor Table for each individually accessible data element with two elements of each description table entry assigned for range check and conversion purposes, one of which elements permits one of the extreme limits of the value range of the data element associated with the Data Descriptor Table entry to be determined and the second of which allows the number of values in the value range of the associated data elements to be determined, and also includes a set of arithmetic circuits interposed in the data path to and from the main memory to be utilised for each read or write of information to and from the main memory, whereby the arithmetic circuits receive their input from the main memory and from the Data Descriptor Table entry associated with a data element in the main memory and deliver their output to the central processor unit by reading of information from the main memory and also receive input from the central processor unit and the Data Descriptor Table entry associated with a data element in the main memory and deliver a corresponding output to the main memory, the master control unit having means for generating an interrupt signal to the central processor unit in the case of an out of range value being detected.

The invention thus allows range checks, and conversions which otherwise would have to be explicitly coded into a programme to be performed automatically, thereby reducing the code volumes and permitting faster execution. The invention also raises the software security within the computer because there is no way that the programmer can forget to perform, or deliberately omit, the range checks and conversions in order to speed up the execution of a programme.

BRIEF DESCRIPTION OF THE DRAWING

FIG. 2 is a chart showing a typical set of binary numbers, together with three alternative decimal schemes corresponding to the binary numbering.

DETAILED DESCRIPTION

Figure 1:
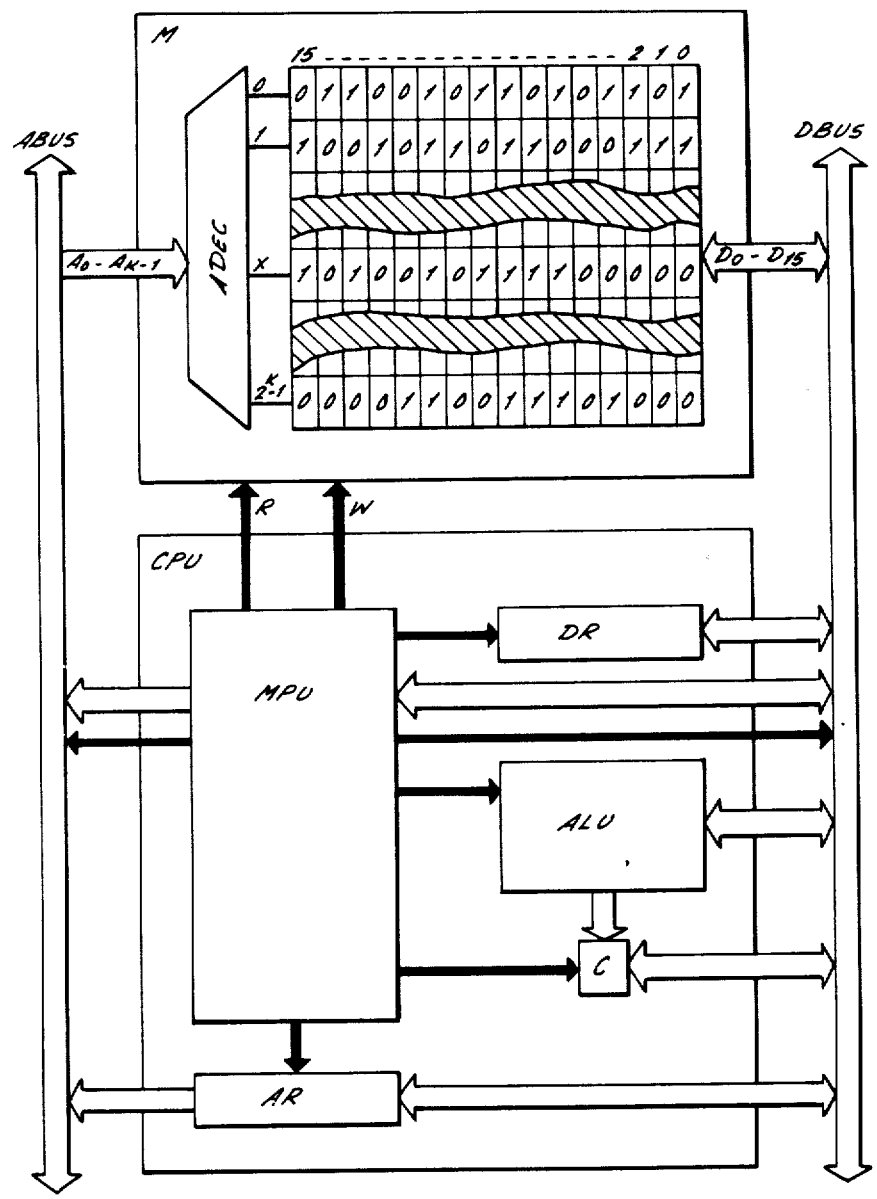
FIG. 1 is a block diagram of a conventional binary computer.
Figure 3:
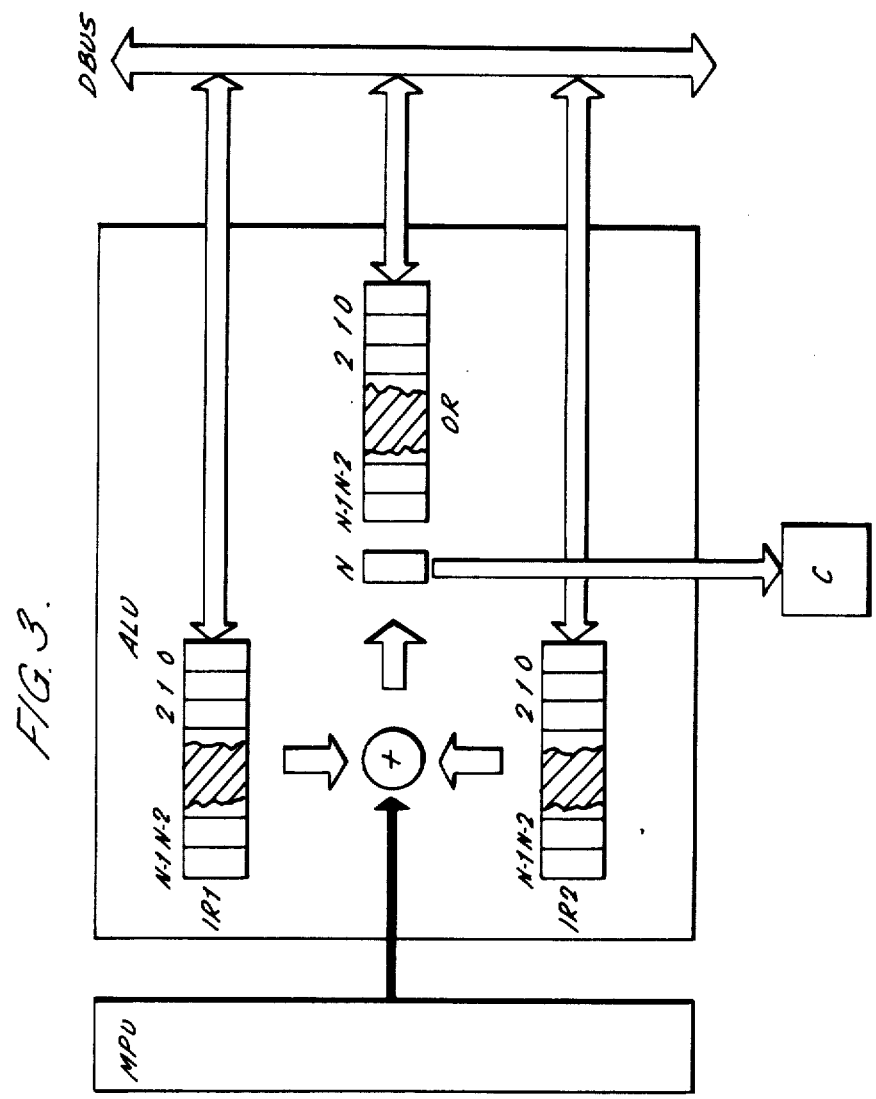
FIG. 3 is partially a block diagram illustrating a typical algebraic operation performed by an arithmetic logic unit in the computer of FIG. 1.

Computers conventionally operate in binary mode, i.e. information is stored and treated in binary form. This is illustrated by FIGS. 1, 2 and 3. FIG. 1 shows a typical binary computer consisting of a Central Processing Unit (CPU) and a Main Memory (M). The CPU is connected to M via an Address Bus (ABUS) with k address bits, a Data Bus (DBUS) with 16 data bits and two control connections (R and W).

The number of data bits on the data bus corresponds with the Word Length of the Main Memory (M), i.e. the number of data bits in each memory word, which in this example is assumed to be 16 bits. Each memory word can therefore assume $2^{16}=65536$ different values.

The number of address bits on the Address Bus (K) defines the number of addressable memory words which is $2^k$. The address of each of these words is defined by the corresponding values $0, 1 \ldots 2^{k-1}$.

The CPU consists of a number of elements of which the most important for the purpose of this description are the Micro Program Unit (MPU), the Arithmetic-Logic Unit (ALU), the Address Register (AR), the Data Register (DR) and the Carry Register (C).

The MPU controls the transfer of information between the various registers of the CPU and the main memory M. If for instance the contents of the Memory Word at address X are to be transferred to the Data Register DR, the MPU would first transfer the value X from MPU itself to the Address Register (AR) via the Data Bus (DBUS) by applying the appropriate Control Signals (All Control Signals in FIG. 1 are indicated by solid black arrows). Once the value X is contained in AR, the corresponding word in the main memory is now indicated. By applying the Read Control Signal (R) to the memory the contents of this memory word is read to the Data Bus and can thereby be gated into DR. When writing into memory the data would be drawn from DR onto the Data Bus and written into the corresponding memory word by application of the Write Control Signal (W).

Information is stored and processed in binary form, whereby a data word with N bits is able to assume $2^N$ different values. FIG. 2 illustrates the different values which may be stored in a data word where $N=4$ and several possible representations of these values. In representation A the actual value may be directly calculated from the corresponding bit position, e.g. the binary value 1011 represents the actual value:

$$2^3 * 1 + 2^2 * 0 + 2^1 * 1 + 2^0 * 1 =$$
$$8 + 2 + 1 = 11$$

In representation B the most significant bit is used as a sign bit with the actual value given by the remaining bits. For positive values the value is calculated as in representation A. For negative values the so called 2:s complement is used, i.e. the value is (the value of representation A)−16. Thus, in this case the value 1011 represents the actual value:

$$2^3 * 1 + 2^2 * 0 + 2^1 * 1 + 2^0 * 1 - 16 \, (2^3 = 1) =$$
$$8 + 2 + 1 - 16 = -5.$$

In representation C, only the values 0011 ... 1100 are used to represent the values 0–9 with 6 of all possible 16 values unused. FIG. 3 illustrates a typical example of an arithmetic operation performed by ALU in FIG. 1. The operation performed is a binary addition, whereby it is assumed that the operands to be added have been transported to two registers within ALU (IR1 and IR2) each of which contains N data bits. The contents of the two registers IR1 and IR2 are added and the result transferred to a result register (OR) with N+1 data bits, of which bit (N+1) is transferred to the Carry Flag (C) and the N least significant bits of the result transferred out on the data bus DBUS. If, for instance, representation A of FIG. 2 is used and the values 5 and 7 are to be added, then:

| | |
|---|---|
| 5 → | 0101 |
| + 7 → | + 0111 |
| Result → | 0 1100 → 12 with NO CARRY |
| | (CARRY) |

In this (carry) case the result is greater than can arithmetically correctly result.

If, as a second exammple, the values 7 and 11 are to be added, then:

| | |
|---|---|
| 7 → | 0111 |
| + 11 → | + 1011 |
| Result → | 1 0010 = 2 with CARRY |
| | (carry) |

In this (carry) case the result is greater than what can be represented by 4 bits, i.e. the result is truncated to its 4 least significant bits due to the limitations of the circuitry involved. Hence the value obtained will be 2 instead of the value 18, which would have been arithmetically correct. In this case the Carry Flag (C) is set to give an indication of the occurred overflow.

The corresponding is, of course, true for other arithmetic operations:

| | |
|---|---|
| 7 → | 0111 |
| − 5 → | 0101 |
| Result → | 0 0010 → 2 with NO CARRY |
| | (CARRY) |
| 7 → | 0111 |
| − 11 → | − 1011 |
| Result → | 1 1100 → 12 with CARRY |
| | (CARRY) |

The above examples illustrate one of the fundamental characteristics of binary arithmetics, i.e. the result is correct only as long as the number of bits in the result does not exceed the number of bits, which can be represented. Normal data word lengths are 8, 16, 24, 32, 48 or 64, depending on the type of CPU used and the value range desired. Regardless of the data word length a Carry Flag is typically employed to indicate when a result exceeds the data word length. It is to be noted, that the existence of the carry flag permits cascaded arithmetics, i.e. sequential operations on related data words.

Within a CPU with data word length 4 as shown in FIG. 2 values greater than 15 may be represented by consecutive data words. Thus the value 125 which corresponds with the binary 7 bit value 1111101 may be represented as two consecutive 4 bit data values 0111 (=7) and 1101 (=13). Similarly 100 corresponds with the 7 bit binary value 1100100 and may be represented by the two 4 bit values 0110 (=6) and 0100 (=4). These can now be added by means of 4 bit arithmetics utilizing so called carry propagation as follows:

| | | | |
|---|---|---|---|
| 125 | → | 0111 | 1101 |
| + 100 | → | 0110 | 0100 |
| Result 1 | → | | 1 0001 |
| Result 2 | → | 0 1101 | (Carry) |
| | | (CARRY) | |
| | | 0001 | |
| Result 3 | → | 0 1110 | |
| Final Result | → | 0 1110 | 0001 → 225 with |
| | | (Carry) | NO CARRY |

By propagating the carry from one 4 bit addition to the next, the end result will still be valid.

It is thus possible to perform arithmetics with any value ranges with a basic N bit ALU. Of course, if the value ranges are in the order of $10^6$, number of steps to perform a single arithmetic operation with a 4 bit ALU will be large and the speed of the CPU therefore low, whereas with a 24 bit CPU the operation can be made in a single step. The ALU in modern CPUs therefore in general operates on the data word length of the memory, with a single Carry Flag to indicate when this word length is exceeded. In some cases a Half Carry Flag is provided to indicate that the value range of a Halfword is exceeded, which permits arithmetics on the least significant half of the bits in a data word. For CPUs where representation B of FIG. 2 is used an Overflow Flag is normally included, which indicates an overflow from positive to negative values, by addition, e.g. $7+5=0111+0101=1100=-4$, or from negative to positive values by subtraction. When programming binary computers it is presently assumed that the value ranges of the actual data elements, which are realised by means of memory words or part of memory words, are either infinite or contain an explicitly specified, finite set of Values.

Logical data elements with conceptually infinite value ranges are defined as integers in conventional high level programming languages and usually implemented by single memory words. In the language definitions integers are usually defined to have implementation dependent value ranges, e.g. in a computer with 32 bit word length the value range would be $-2,147,483,648$ to $+2,147,483,647$ whereas in a computer with 32 bit word length the value range would be $-32768$ to $+32767$ assuming the values to be represented according to alternative B in FIG. 2. Because programmers assume an infinite value range for integers the Carry Flag Utility is never used in this case. However, the possibility to exceed the value range still exists. This may even be critical in the case where a programme, which runs on a 32 bit computer, is to be transported onto a 16 bit computer and the original programe works with values in excess of 100000. In this case the programme will simply not work correctly on the 16 bit computer, because only values in the range $-32768$ to $32767$ may be correctly represented.

When the logical data elements may assume values from an explicitly defined value range, the data elements are always implemented by means of memory words or parts of memory words such that the total logical value range may be physically implemented. Thus, a data element with the logical Value range $-100010$ to $100000$ would be implemented by a single memory word in a 32 bit computer, but by two consecutive memory words (with propagated carry) in a 16 bit computer, in contrast with the previously mentioned integer solution where a single memory word is used in both cases. With an explicitly specified value range no corresponding portability problem will occur. Another problem does occur, however, when the total physically available value range of a memory word is not completely utilized. This will be illustrated as follows:

Assume that a data element X has been specified with the logical value range 0–15, corresponding with alternative A in FIG. 2. Assume furthermore, that the word length N of the data memory is 4 bits. If now an operation corresponding to the high level language statement:

X:=X+1 is carried out by a corresponding computer then this may be performed by a single machine instruction:

ADD X,1

The possible results of the execution of this instruction, assuming operation according to FIG. 3, is illustrated by the following table:

| X Before | X After | Carry |
| --- | --- | --- |
| 0 | 1 | No |
| 1 | 2 | No |
| 2 | 3 | No |
| 3 | 4 | No |
| 4 | 5 | No |
| 5 | 6 | No |
| 6 | 7 | No |
| 7 | 8 | No |
| 8 | 9 | No |
| 9 | 10 | No |
| 10 | 11 | No |
| 11 | 12 | No |
| 12 | 13 | No |
| 13 | 14 | No |
| 14 | 15 | No |
| 15 | 0 | Yes |

It can thus be seen that the value range repeats cyclically with carry indicating that the value range has been exceeded.

Assume now that a second data element Y is specified with the logical value range 0–9. The physical implementation of this data element still requires 4 bits, i.e. the physical implementation of Y is indistinguishable from the physical implementation of the data element X. If now an operation corresponding to the high level language statement Y:=Y+1  it would be logically expected that the result would be:

| Y Before | Y After | Carry |
| --- | --- | --- |
| 0 | 1 | No |
| 1 | 2 | No |
| 2 | 3 | No |
| 3 | 4 | No |
| 4 | 5 | No |
| 5 | 6 | No |
| 6 | 7 | No |
| 7 | 8 | No |
| 8 | 9 | No |
| 9 | 0 | Yes |

However, if the operation Add Y,1 is carried out by means of a similar machine instruction, the result will be:

| Y Before | Y After | Carry | Comment |
| --- | --- | --- | --- |
| 0 | 1 | No | |
| 1 | 2 | No | |
| 2 | 3 | No | |
| 3 | 4 | No | |
| 4 | 5 | No | |
| 5 | 6 | No | |
| 6 | 7 | No | |
| 7 | 8 | No | |
| 8 | 9 | No | |
| 9 | 10 | No | Illegal Result, No Carry |
| 10 | 11 | No | Illegal Values |
| 11 | 12 | No | Illegal Values |
| 12 | 13 | No | Illegal Values |
| 13 | 14 | No | Illegal Values |
| 14 | 15 | No | Illegal Values |
| 15 | 0 | Yes | Illegal Start Value |

It should immediately be obvious that the operation as performed by the ALU alone will not give the desired result. The desired result can in fact, not be obtained by means of a single instruction. Instead, a programme consisting of a sequence of instructions is required, for example:

| ADD | Y, 1; Add 1 to the contents of Y |
| --- | --- |
| CP | 10; Compare with 10. |
| JL | RESULT; Jump to RESULT if less than 10, otherwise: |
| SUB | Y, 10; Subtract 10 from Y |
| SCF | ; Set Carry Flag. |
| RESULT: | | the above sequence of machine instructions ensures that after addition of 1, the value will still be within the desired value range 0–9 and that, furthermore, the Carry Flag will be set when the value range is exceeded. This carries both a memory and an execution time overhead, because for every addition at least three machine instructions have to be executed i.e. the Add, the Compare and the Jump instructions.

The situation is further complicated for value ranges which do not start from 0 or from a power of 2. If for instance a data element H is used to indicate the hour of the day with the value range 1–12, then the high level language statement H:=H+1  should now be performed as:

| H Before | H After | Carry |
| --- | --- | --- |
| 1 | 2 | No |
| 2 | 3 | No |
| 3 | 4 | No |
| 4 | 5 | No |
| 5 | 6 | No |
| 6 | 7 | No |
| 7 | 8 | No |
| 8 | 9 | No |
| 9 | 10 | No |
| 10 | 11 | No |
| 11 | 12 | No |
| 12 | 1 | Yes |

However, in order to achieve this result, the following sequence of machine instructions must be executed:

| ADD | H, 1 | ; Add 1 to the contents of H |
| --- | --- | --- |
| CP | 13 | ; Compare with 13 |
| JL | RESULT | ; Jump to RESULT if less than 13 otherwise: |
| SUB | H, 12 | ; Subtract 12 from H |

| | | | |
|---|---|---|---|
| SCF | | | ; Set Carry Flag |
| RESULT: | | | | i.e. the same type of instruction sequence has to be executed as before, Furthermore, if the value of H is calculated as a result of a general expression:

H:=EXPR where this expression (EXPR) may contain any type of calculation, then the resulting value of the expression must be translated into the existing value range before storing it. This can now be accomplished by the following instruction sequence, assuming that the calculated value of EXPR is temporarily held in a Data Register DR:

| | | | |
|---|---|---|---|
| | SUB | DR, 1 | ; Subtract 1 from DR |
| L1: | SUB | DR, 12 | ; Subtract 12 from DR |
| | JGE | L1 | ; Repeat from L1 if > 0 |
| L2: | ADD | DR, 12 | ; Add 12 to DR |
| | JL | L2 | ; Repeat from L2 if < 0 |
| | ADD | DR, 1 | ; Add 1 to DR |
| | LD | H, DR | ; Store DR into H. |

It is evident that the overhead now becomes completely unfeasible, especially if all high level language statements would be translated with full range checking. In order to keep the overhead low and the programme translation simple, automatic range checking is usually not implicitly provided. It is therefore up to the programmer to build in adequate explicit range checks in all places where the absence of such range checks may be fatal for the system. However, as a consequence, the possibility still exists that a data element may be assigned an out-of-range value and thereby cause inadvertent faults. With a system according to the invention range checking and conversion are automatically performed without the programmer having to specify this explicitly and without any possibility for the programmer to bypass the range check and conversion. This makes the code generation simple, reduces required memory for the programmes and, at the same time, increases the execution speed. Furthermore, the software integrity is raised, because no data element may assume a value which is out of range for that data element.

The invention will be described in detail with the aid of FIG. 4.

Figure 4:
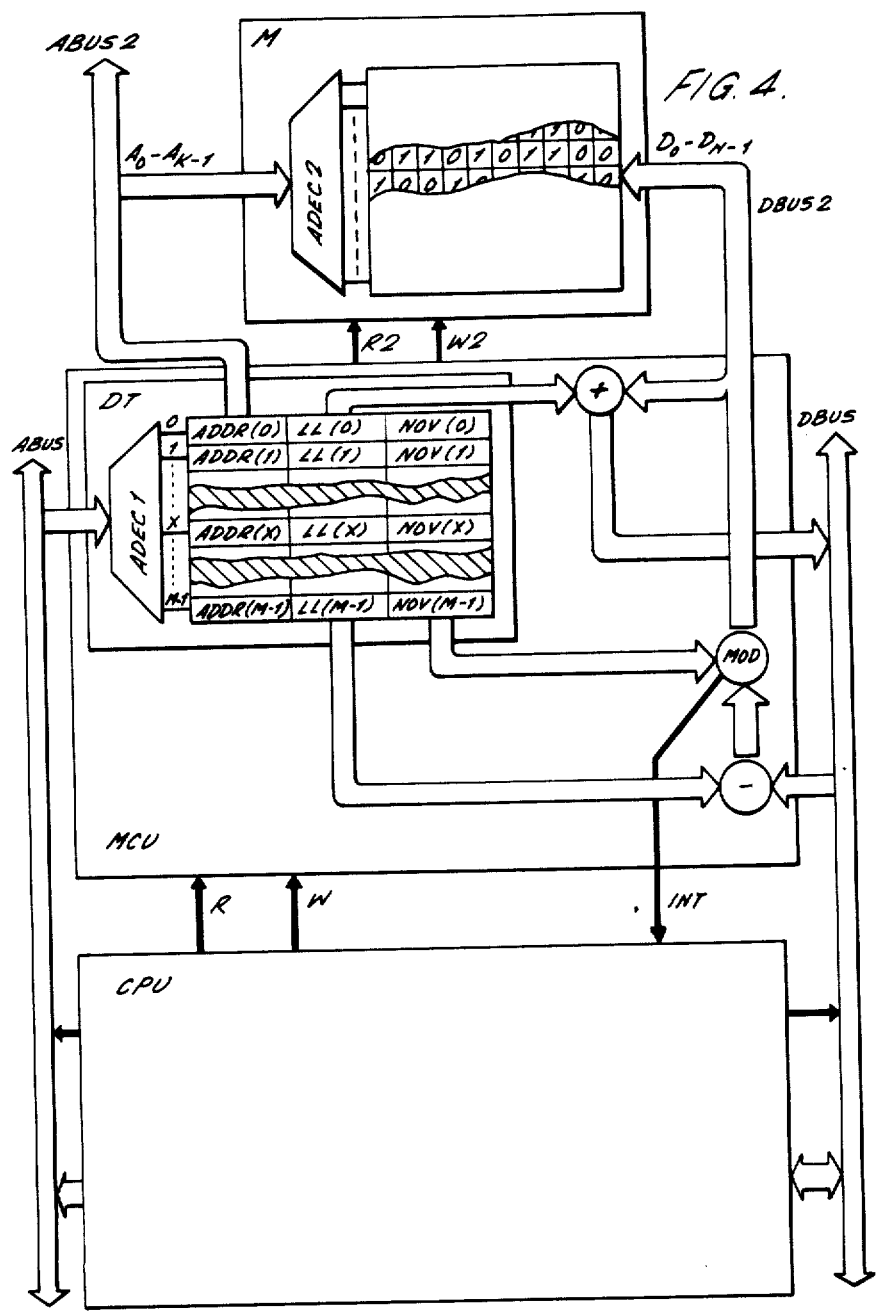
FIG. 4 is a block diagram showing a computer system with a master control unit, in accordance with the present invention.

FIG. 4 shows the general principle of the invention. A Master Control Unit (MCU) according to the invention is interposed between Main Memory M and the CPU, which in themselves may be of the type described in FIG. 1, whereby the Address and Data Buses (ABUS and DBUS) from the CPU are connected to the MCU, which via secondary Address and Data Buses (ABUS2 and DBUS2) is connected to the main memory M. The control signals R and W for reading and writing from the CPU are connected to the MCU. The MCU issues its own secondary read and write signals (R2 and W2) when actually reading and writing in the main memory. MCU is also via an interrupt line (INT) of known design connected back to the CPU.

The MCU contains an informal memory for a Data Descriptor Table (DT) for translation of virtual addresses issued by the CPU on the Address Bus (ADBUS) into Real Addresses issued by the MCU to the main memory M on the secondary Address Bus (ABUS2). The Data Descriptor Table contains one entry for every addressable data element or structure in the main memory M, whereby the actual entry is indicated by means of an Address Decoder ADEC1. Each entry is shown to contain three parts in FIG. 4, namely the ADDR, LL and NOV parts. The ADDR part participates in the Virtual to Real Address translation. The principles of this translation are in themselves known and are not subject of this invention.

The LL part of a descriptor entry contains the lowest value, which may be assumed by the corresponding date element associated with the entry. The NOV part contains the number of values, which may be assumed by the corresponding data element. In our earlier example with the hour counter H with the value range 1-12, $LL_H=1$ and $NOV_H=12$. The use of these elements will be further described below.

The MCU also contains three arithmetic circuits, an Adder (in FIG. 4 denoted by $\oplus$), a Subtracter (in FIG. 4 denoted by $\ominus$) and a Modulo Extracter (in FIG. 4 denoted by Mod).

According to the realisation of the invention shown in FIG. 4, information is stored in memory in the unsigned, absolute representation, which corresponds to representation A in FIG. 2, where the lowest value of the logical value range of a data element is represented by the binary value 0. Each data element has an explicitly defined value range, where both the lowest value (LV) and the highest value (HV) must be specified. The actual value range repeats cyclically. This means for instance that:

$HV+1=LV$ $LV-1=HV$

The LL and NOV elements in the Descriptor Table entry for a data element with the value range LV-HV are, according to the invention to be set to:

LL:=LV

NOV:=HV−LV+1

A data element X with the value range 3-7 would thus have the descriptor elements $LL_X=3$, $NOV_X=5$ with the physical binary representation of these values in the memory represented by:

3: 000
4: 001
5: 010
6: 011
7: 100

In order to allow the CPU to operate on the logical values of any data element the physical values stored in the memory must first be translated into their logical equivalents before transferring them to CPU. Hence, when CPU issues an address on the Address Bus (ABUS) and a read signal R, the MCU reacts on the read signal, decodes the initial address via ADEC1 to indicate a Descriptor Table entry in a conventionally known way and issues the actual address to the main memory M also in a conventionally known way, at the same time issuing a secondary read signal (R2) to the main memory. When data is returned from the main memory it enters one of the entries for the MCU ADDER circuit $\oplus$, with the other entry of the ADDER circuit obtaining its information from the LL element of the table entry indicated by the address information on ABUS. These two entries are now added and the result transferred on the Data Bus (DBUS) to the CPU. This simple addition ensures the logical validity of the information as seen from the CPU, provided that the information stored in the memory lies within its physical value range, i.e. 0-(NOV-1).

When the CPU stores a value in the main memory the virtual address of the data element is issued on the Address Bus (ABUS) and the Write signal (W) is sent to the MCU. The MCU translates the virtual address to the corresponding real main memory address in the same way as for a read operation and issues this address on the secondary address bus (ABUS2). However, in this case no secondary write is yet issued. The data obtained from the CPU via the Data Bus (DBUS) is used as input to the MCU subtracter circuit ⊖, with the other input obtained from the LL element in the indicated Descriptor Table Entry. The result of the subtraction is now a normalized value. However, there is no guarantee that the value is actually within the specified value range. To ensure that the value, which is finally stored into the memory actually lies within the value range the result from the subtraction is used as input to the Modulo Extractor Circuit (Mod), where the NOV entry of the indicated Descriptor Table entry is used as the other input and the actual result of the modulo extractor finally stored in memory (at this point the MMU issues the W2 signal to the main memory M). Modulo extraction is equivalent with dividing by the actual modulo, the result being the remainder by this division. Hence, with $LL_X=3, NOV_X=5$, storing of the logical value 7 would give:

(1) Subtraction: $7-LL_X=7-3=4$
(2) Modulo extraction: 4 mod $NOV_X=4$ mod $5=4$ or the actual binary value stored would be 100. Storing of the logical value 9 (out of range value) would now give:
(1) Subtraction: $9-LL_X=9-3=6$
(2) Modulo extraction: 6 mod $NOV_X=6$ mod $5=$ remainder of $6/5=1$ By the modulo extraction any value within range will give the quotient 0. Conversely, any out-of-range value will give a non-zero quotient. This fact is, according to the invention utilized in the Modulo Extractor Circuit (Mod) to generate an interrupt signal to the CPU (INT), which interrupt signal is used to initiate an Interrupt Routine, the sole task of which is to set the Carry Flag of the CPU.

When data is transferred to the main memory M from the CPU via the MCU an automatic range conversion is always obtained so that the stored value always is an in-range value. If no other means of accessing the main memory exists and furthermore adequate means for detection or prevention of spurious data errors are available, then the stored data will remain in-range until overwritten. This is the reason why only a single Adder is required in the data path from the main memory M to the CPU. If memory security cannot be guaranteed then in-range data security may still be guaranteed also in this case by inserting a second Modulo Extractor Circuit in the data path between the memory M and the MCU Adder Circuit, alternatively using the already existing Modulo Extractor Circuit and connecting its output to the Adder Circuit. These are however only variations of the basic idea.

Other variations of the basic idea is to use the Lowest Value (LU) and the Highest Value (HV) directly in the Data Description Table to achieve the same or an equivalent result by means of a suitable algorithm or to use the Highest Value (HV) and the number of values NOV, where now the Highest Value would correspond with a predefined absolute binary combination (e.g. 0).

In this case the Adder and Subtractor Circuits in FIG. 4 would simply be exchanged. A further variation is to use other representations e.g. B or C in FIG. 2 with the corresponding modifications of the arithmetic circuitry. All such variations are considered to be covered by the basic idea.

With an MCU according to the invention interposed between a CPU and a main memory M any arithmetic operation may now be simply specified by the programmer and equally simply executed by the CPU. Hence the instruction sequence:

|   |   |   |
|---|---|---|
| ADD | H, 1 | ; |
| CP | 13 | ; |
| JL | RESULT | ; |
| SUB | H, 12 | ; |
| SCF |  | ; |
| RESULT: |  | ; | which was utilized to perform the operation $H:=H+1$ for an hour counter with the value range 1-12 in a system without the MCU according to the invention, may now be replaced by the single instruction: ADD H,1;
in a system with the MMU.

Similarly, the instruction sequence:

|   |   |   |   |
|---|---|---|---|
|   | SUB | DR, 1 | ; |
| L1: | SUB | DR, 12 | ; |
|   | JGE | L1 | ; |
| L2: | ADD | DR, 12 | ; |
|   | JL | L2 | ; |
|   | ADD | DR, 1 | ; |
|   | LD | H, DR | ; | may, with the invention be replaced by the single instruction LD
H, DR;

It will therefore be evident that utilizing a MCU according to the invention will significantly reduce both the required memory space for the programmes and the corresponding execution times. Furthermore, use of the MCU simplifies the generation of machine instructions from high level language programmes and thereby removes one of the present obstacles to generation of efficient code from programmes coded in high level languages. The MCU also directly increases the system integrity due to the fact that stored out-of-range values now become physically impossible. Finally, it is to be remembered, that the MCU may be used together with any CPU, for instance any commercially available microprocessor, because no hardware modification of the CPU is required.

I claim:

1. A computer system with automatic range checking and conversion of data words, comprising:
a central processing unit;
main memory means for storing information, in binary form; and
master control means interposed between said main memory means and said central processing unit for automatically normalizing data words having logical values from said central processing unit to values within predetermined ranges and transmitting the normalized data words to said main memory means for storage therein and for converting normalized data words from said main memory means to logical values utilizable by said central processing unit and transmitting the converted data words to said central processing unit, said master control means comprising:
- secondary memory means including a data descriptor table for storing for each data storage address in said main memory means a first entry specifying a predetermined number of possible consecutive values allowable for a data word stored in such data storage address and a second entry specifying a limiting value of said predetermined number of possible consecutive values;
- arithmetic circuit means operatively connected to said secondary memory means, said main memory means and said central processing unit for algebraically combining a data word from any selected data storage address in said main memory means with the limiting value corresponding to said selected data storage address and forwarding a resulting converted data word to said central processing unit and for receiving an incoming data word from said central processing unit to be stored in a given data storage address in said main memory means, algebraically combining said incoming data word with the limiting value corresponding to said given data storage address and operating on said incoming data word with the predetermined number of possible consecutive values corresponding to said given data storage address to obtain a normalized data word and transmitting the resulting normalized data word to said main memory means; and
- checking means operatively connected to said central processing unit for checking values of data words to be transmitted to the memory or processor against predetermined data ranges and transmitting to said central processing unit an interrupting signal upon detection of an out-of-range value.

2. A computer system according to claim 1, further comprising a data bus connecting said central processing unit to said master control means, said main memory means storing data words each having a predetermined number of bits, the second entry corresponding to any given data storage address specifying a lowest value of the possible consecutive values of a data word storable at such data storage address, said arithmetic circuit means including an addition circuit adapted to algebraically combine binary words having said predetermined number of bits, said addition circuit being operatively connected to said main memory means, said secondary memory means and said data bus for algebraically combining data words from said main memory means with corresponding limiting values from said secondary memory means, said arithmetic circuit means further including a subtraction circuit operatively connected to said secondary memory means and said data bus for algebraically combining binary words received from said secondary memory means and said central processing unit via said data bus, said arithmetic circuit means also including a modulo extraction circuit operatively connected to said secondary memory means, said subtraction circuit and said main memory means for modulo dividing an output form said subtraction circuit by a said first entry from said secondary memory means and transmitting the resulting normalized data word to said main memory means.

3. A computer system according to claim 2, further comprising an additional modulo extraction circuit having a data input operatively connected to an output of said addition circuit, said additional modulo extraction circuit having a modulo input operatively connected to said main memory means for receiving a said first entry therefrom, said additional modulo extraction circuit having a data output connected to said data bus and an overflow indicator output connected to aid central processing unit.

4. A computer system according to claim 2 wherein said modulo extraction circuit is also operatively connected to said addition circuit for modulo dividing an output from said addition circuit by a said first entry from said secondary memory means and transmitting the resulting normalized data word to said central processing unit.

5. A computer system according to claim 1, further comprising a data bus connecting said central processing unit to said master control means, said main memory means storing data words each having a predetermined number of bits, the second entry corresponding to any given data storage address specifying a highest value of the possible consecutive values of a data word storable at such data storage address, said arithmetic circuit means including a subtraction circuit adapted to algebraically combine binary words having said predetermined number of bits, said subtraction circuit being operatively connected to said main memory means, said secondary memory means and said data bus for algebraically combining data words from said main memory means with corresponding limiting values from said secondary memory means, said arithmetic circuit means further including an addition circuit operatively connected to said secondary memory means and said data bus for algebraically combining binary words received from said secondary memory means and said central processing unit via said data bus, said arithmetic circuit means also including a modulo extraction circuit operatively connected to said secondary memory means, said addition circuit and said main memory means for modulo dividing an output from said addition circuit by a said first entry form said secondary memory means and transmitting the resulting normalized data word to said main memory means, said modulo extraction circuit having an overflow indicator output connected to said central processing unit.

6. A computer system according to claim 5, further comprising an additional modulo extraction circuit having a data input operatively connected to an output of said subtraction circuit, said additional modulo extraction circuit having a modulo input operatively connected to said main memory means for receiving a said first entry therefrom, said additional modulo extraction circuit having a data output connected to said data bus and an overflow indicator output connected to said central processing unit.

7. A computer system according to claim 5 wherein said modulo extraction circuit is also operatively connected to said subtraction circuit for modulo dividing an output from said subtraction circuit by a said first entry from said secondary memory means and transmitting the resulting normalized data word to said central processing unit.

8. A computer system with automatic range checking and conversion of data words, comprising:
- a central processing unit;

main memory means for storing information in binary form; and master control means interposed between said main memory means and at least a portion of said central processing unit for automatically normalizing data words having logical values from said portion of said central processing unit to values within predetermined ranges and transmitting the normalized data words to said main memory means for storage therein and for converting normalized data words from said main memory means to logial values utilizable by said central processing unit and transmitting the converted data words to said portion of said central processing unit, said master control means comprising:

secondary memory means including a data descriptor table for storing for each data storage address in said main memory means a first entry specifying a predetermined number of possible consecutive values allowable for a data word stored in such data storage address and a second entry specifying a limiting value of said predetermined number of possible consecutive values;

arithmetic circuit means operatively connected to said secondary memory means, said main memory means and said portion of said central processing unit for algebraically combining a data word from any selected data storage address in said main memory means with the limiting value corresponding to said selected data storage address and forwarding a resulting converted data word to said portion of said central processing unit and for receiving an incoming data word from said portion of said central processing unit to be stored in a given data storage address in said main memory means, algebraically combining said incoming data word with the limiting value corresponding to said given data storage address and operating on said incoming data word with the predetermined number of possible consecutive values corresponding to said given data storage address to obtain a normalized data word and transmitting the resulting normalized data word to said main memory means; and checking means operatively connected to said portion of said central processing unit for checking values of data words to be transmitted to the memory or processor against predetermined data ranges and transmitting to said portion of said central processing unit an interrupt signal upon detection of an out-of-range value.

9. A computer system according to claim 8 wherein said arithmetic circuit means forms a portion of said central processing unit.

10. A computer system according to claim 8 wherein said arithmetic circuit means is separate and distinct from said central processing unit.

* * * * *